United States Patent
Chauquet

(10) Patent No.: US 6,712,961 B2
(45) Date of Patent: Mar. 30, 2004

(54) EXTERNAL TANK FILTER, IN PARTICULAR FOR AN AQUARIUM

(75) Inventor: Jacques Jean Chauquet, Bonneville (FR)

(73) Assignee: Rena S.A. (FR)

( * ) Notice: Subject to any disclaimer, the term of this patent is extended or adjusted under 35 U.S.C. 154(b) by 0 days.

(21) Appl. No.: 10/275,089
(22) PCT Filed: May 2, 2001
(86) PCT No.: PCT/FR01/01343
§ 371 (c)(1), (2), (4) Date: Feb. 25, 2003
(87) PCT Pub. No.: WO01/83078
PCT Pub. Date: Nov. 8, 2001

(65) Prior Publication Data
US 2003/0164324 A1 Sep. 4, 2003

(30) Foreign Application Priority Data
May 2, 2000 (FR) .............................................. 00 05591

(51) Int. Cl.$^7$ ........................ A01K 63/04; B01D 35/027
(52) U.S. Cl. .................... 210/169; 210/238; 210/416.2; 210/419
(58) Field of Search ................................ 210/169, 232, 210/238, 416.1, 416.2, 418, 419, 429; 119/259

(56) References Cited

U.S. PATENT DOCUMENTS

| 3,950,251 A | * | 4/1976 | Hiller .......................... 210/232 |
| 4,529,515 A | | 7/1985 | Selz |
| 4,806,240 A | * | 2/1989 | Giordano et al. ........... 210/232 |
| 4,818,397 A | * | 4/1989 | Joy ............................. 210/232 |
| 4,946,047 A | | 8/1990 | Kurokawa et al. |
| 5,474,674 A | * | 12/1995 | Bresolin et al. ............. 210/169 |
| 5,826,854 A | | 10/1998 | Janvrin et al. |
| 6,106,709 A | * | 8/2000 | Bresolin ..................... 210/169 |

FOREIGN PATENT DOCUMENTS

EP        0 833 197        4/1998

* cited by examiner

Primary Examiner—Fred G. Prince
(74) Attorney, Agent, or Firm—Cantor Colburn LLP

(57) ABSTRACT

A filter external to a tank including a vessel, a lid for closing the vessel, a removable connector including means of fixing the connector to the lid, a pipe for conveying water from the tank, a pipe for returning water to the tank, and couplings for connecting the two pipes to the connector, each coupling being equipped with a valve which selectively allows or prevents the passage of water, the connocter including a single means for allowing simultaneous actuations of the valves and actuation of the means of fixing the connector to the lid.

14 Claims, 3 Drawing Sheets

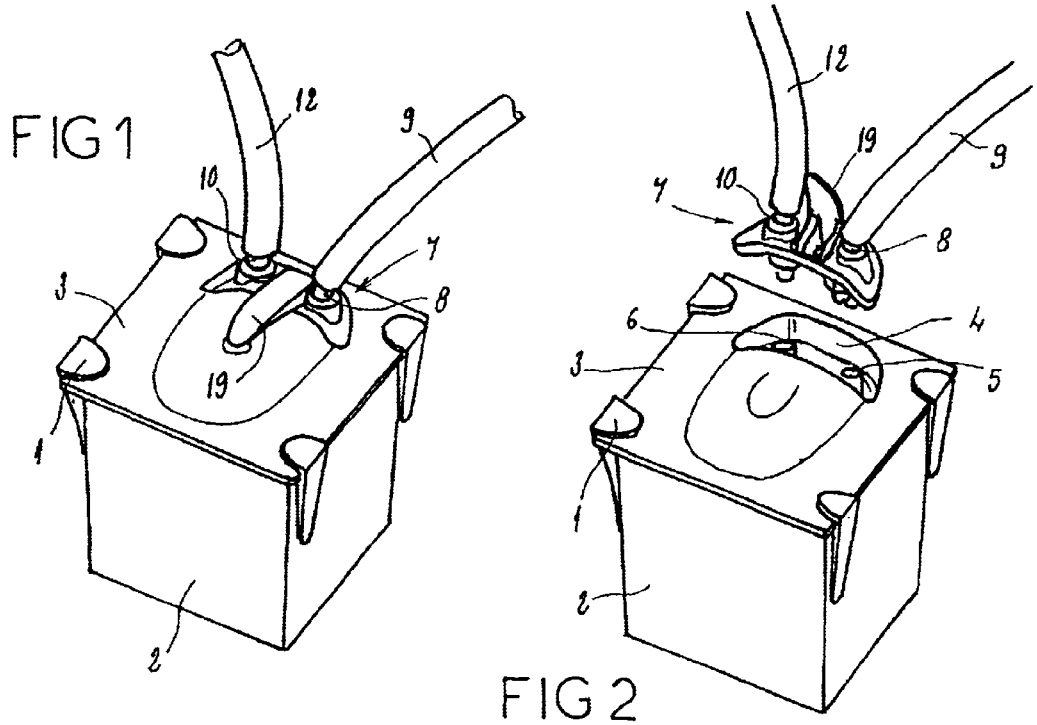
FIG 1
FIG 2
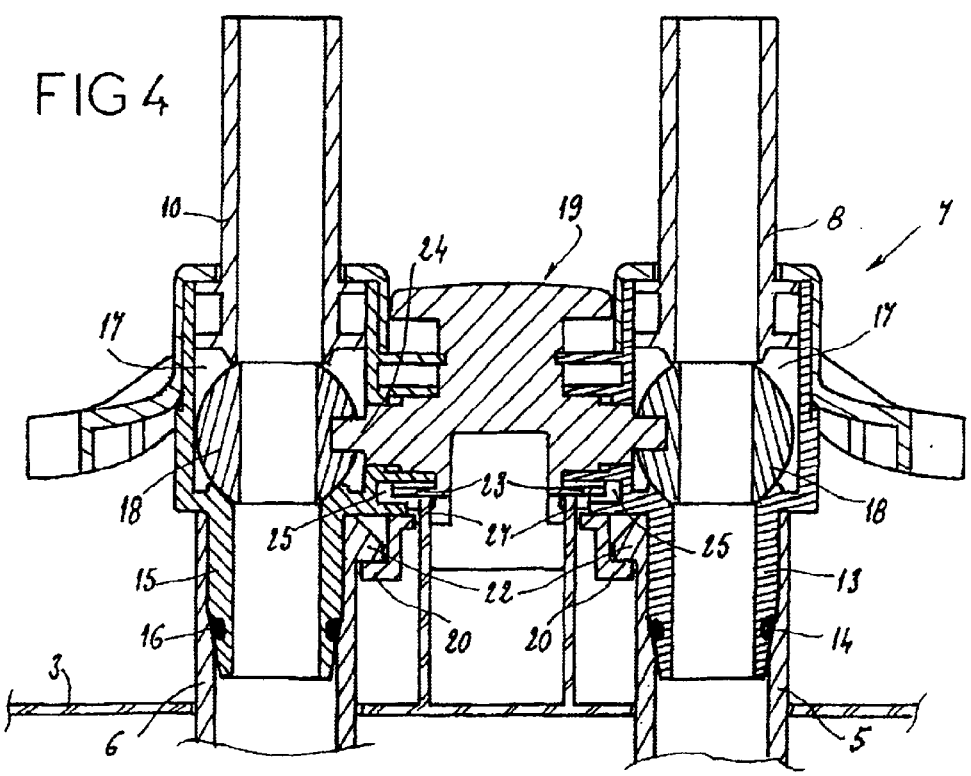
FIG 4

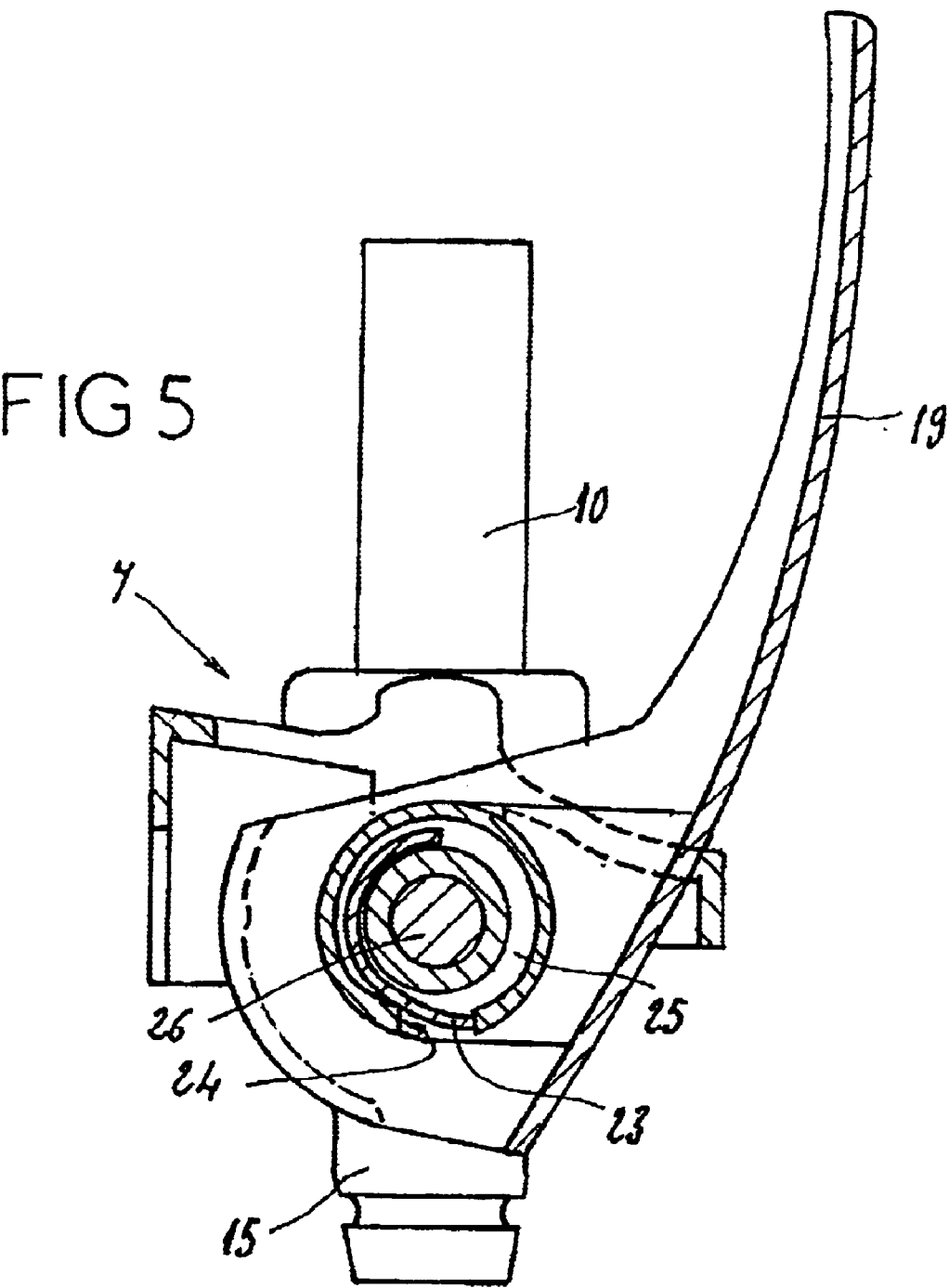

EXTERNAL TANK FILTER, IN PARTICULAR FOR AN AQUARIUM

FIELD OF THE INVENTION

The invention is directed towards a filter external to a tank and, in particular, although not exclusively, to an aquarium.

DESCRIPTION OF RELATED ART

In order to keep the water in a tank in a satisfactory state of cleanliness it is necessary to filter it. The filtering of the water can be carried out either by a filter mounted inside the tank or by a filter external to the latter and connected to the tank by pipes, one for conveying water and one for returning water, a pump circulating the water and the tank being closed in a sealed manner during periods of use.

A filter external to a tank has a certain number of advantages over a filter contained in the tank. Thus, access for maintenance is easier, and maintenance is performed less frequently in that the filter is generally larger. Furthermore, the external filter has advantages in terms of cleanliness because, when it is being cleaned, impurities are not returned to the inside of the tank as is the case when cleaning a filter integrated into the tank.

A filter external to a tank comprises a vessel closed in a sealed manner by a lid equipped with couplings, one for the entry of water from the tank and one for returning water to the tank. The vessel contains a basket in which there are several layers of materials with different functionalities. These are a foam with physical action on filtration, components made of porous material which have a biological action during filtration, and components such as active charcoal, which have a chemical action on the filtration. All these various functions yield crystal-clear water. The water enters at the bottom and rises up vertically through the baskets containing the various components, and leaves again at the lid.

In general, there is a valve on each pipe, namely the pipe for conveying water to the vessel and the pipe for returning water. There is also a lever for attaching the lid to the vessel. To carry out an operation of cleaning the filter, the two valves need to be closed before the lever which catches the couplings on the lid of the vessel is unlocked. The vessel can then be taken away to a sink where the filter can be cleaned.

One essential disadvantage with this device is that there is no safety feature. It is therefore possible to forget to close a valve, or alternatively to accidentally open a valve when the coupling with which this valve is equipped is not yet locked onto the lid of the vessel. The use of such a filter therefore entails preceding with great caution.

SUMMARY OF INVENTION

A filter external to a tank is provided, comprising a device for connecting to the water conveying and water return pipes, which is of a simple structure and guarantees complete safety of use, making sure that, when the couplings are detached from the vessel, the valves equipping them have of necessity to be closed.

To this end, in the filter to which it relates, of the type comprising a sealed vessel containing various filtration components and consisting of a vessel closed by a lid equipped with a removable connector for a pipe for conveying water from the tank and a pipe for returning water to the tank, each of the couplings for connecting the two pipes to the connector being equipped with a valve which either does or does not allow water to pass, and the connector being equipped with means of fixing to the lid, is characterized in that the connector is equipped with a single means allowing, on the one hand, simultaneous actuation of the valves mounted on the two pipes and, on the other hand, actuation of the means of fixing the connector to the lid.

The single means in a first movement closes the valves then releases the means of fixing the connector to the lid and in a second movement fixes the connector to the lid then opens the valves. This filter is therefore very practical to use, because actuation of a single means allows the valves to be operated, on the one hand, and the connector to be fixed to the lid, on the other. Furthermore, the operator cannot make handling errors, in that the movements for actuating the valves and for actuating the means of attachment to the connector are always offset in time and performed in the appropriate order.

Advantageously, the single means is equipped with a safety member preventing it from being actuated when the connector is not positioned on the lid of the vessel. This characteristic is advantageous in that it prevents any operation of the single means when the connector is not positioned on the lid of the vessel. It is thus impossible to open the valves when the connector is not positioned on the vessel.

Advantageously, the single means comprises a pivoting lever.

According to one embodiment, the lever can pivot about an axis which is parallel to the plane of the lid of the vessel, is arranged between the couplings for connecting the two pipes and drives the spherical plugs of the two valves which also pivot about the same axis, the connector comprising on its underside two portions of piping intended to be engaged with sealing in two portions of piping belonging to the lid allowing liquid to pass between the vessel and the pipes, the lever comprising an actuating part protruding from the upper face of the connector and a catching part consisting of at least one ramp intended to catch behind a finger integral with the lid.

In practice, in order to remove the connector, the lever is actuated in one direction of pivoting, during which movement the two spherical-plug valves are rotated to the closed position, after which each ramp secured to the lever disengages from the finger behind which it was engaged, allowing the connector to be released from the lid.

According to another feature of this filter, the safety member preventing actuation of the lever when the connector is not positioned on the lid consists of at least one elastic tongue one end of which is integral with the turning part or hub of the lever and the other end of which tends to pivot outward under the effect of the elasticity of the material, this tongue being guided while the lever pivots in a groove made in a cheek integral with the connector, this groove being open and allowing the free end of the tongue to emerge and bear against a wall delimiting the groove, when the lever is in the valves-closed position, this wall being situated forward in the direction of rotation toward the opening of the valves, a finger integral with the lid being provided which, when the connector is positioned on the lid, presses on the free end of the tongue to retract it and allow the lever to be pivoted in the direction of opening of the valves. In practice, the connector needs to be positioned on the lid in order to retract the free end of each locking tongue, before the lever is pivoted to attach the connector to the lid and open the valves.

It may be noted that the pressure exerted on the safety tongues may be very light in order to avoid pushing the connector too far in with respect to the lid before turning the lever. Indeed, the shape of the ramps and of the fingers, forming cams, may improve the engagement of the connector on the lid.

According to one possibility, the valves are in the closed position when the lever is in the vertical position, the free end of each safety tongue then being in the bottom position of the hub, and the finger integral with the lid and intended to press against the tongue being vertical and facing upward.

To make the connector easier to position with respect to the lid, the upper wall of the lid of the vessel has a recess into which the connector can fit.

DESCRIPTION OF THE DRAWINGS

In any event, the invention will be clearly understood with the aid of the description which follows, with reference to the appended diagrammatic drawing which, by way of nonlimiting example, depicts one embodiment of this filter:

FIG. 1 is a very diagrammatic view of the filter under conditions of use;

FIG. 2 is a view similar to FIG. 1, the connector being detached;

FIG. 4 is a view in longitudinal section of the connector in position fixed on the lid;

FIG. 5 is a view in cross section of the connector depicting the member for locking this connector in the valves-closed position.

DETAILED DESCRIPTION OF INVENTION

Figure 3:
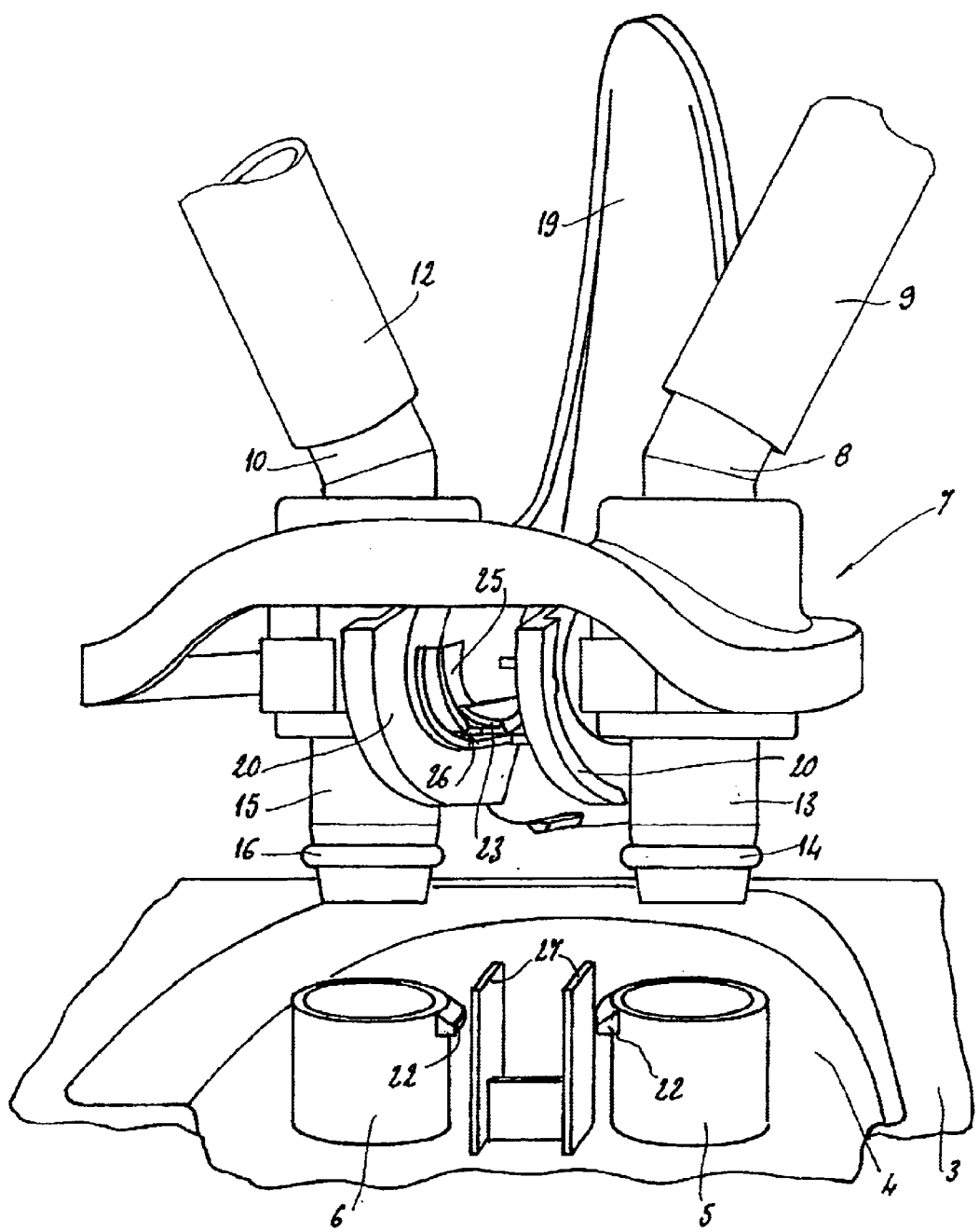
FIG. 3 is a an exploded perspective view of the connector and of part of the lid into which the connector can be fixed.

FIGS. 1 and 2 depict a filter external to a tank comprising a vessel 2 closed sealingly by a lid 3 held on the vessel by hooks 1. The upper face of the lid 3 has a recess 4 into which a portion of piping 5 for conveying water to the filter and a portion of piping 6 for water leaving the filter emerge. A connector 7 is intended to be fitted into this recess 4. This connector 7 comprises a first coupling 8 for mounting a pipe 9 for conveying water from the tank, and a second coupling 10 for mounting a pipe 12 for returning water to the tank.

The connector 7 is equipped, on its underside, with a portion of piping 13, fitted with an O-ring 14, intended to be engaged in the portion of piping 5 of the lid, and with a portion of piping 15 equipped with an O-ring 16, intended to be engaged in the portion of piping 6 of the lid. The connector 7 comprises two valves 17 equipped with plugs 18 driven by the same member.

The connector 7 comprises a lever 19 mounted to pivot about an axis corresponding to the axis of the plugs 18 of the valves 17 and has a part fixedly mounted on these plugs in order to turn them. In its lower part, the lever 19 comprises two ramps 20 which are intended, when the lever is pivoted from a vertical position depicted in FIGS. 3 and 5 to a horizontal position pressed against the lid, to engage behind two fingers 22 integral with the two portions of piping 5, 6 protruding from the lid. It should be noted that, starting out from a position in which the lever 19 is pressed against the lid, and the valves 17 are in the open position, as depicted in FIG. 4, pivoting the lever 19 upward results, first of all, in closure of the valves 17 then in the ramps 20 escaping from the fingers 22 so that the connector 7 can no longer be released from the lid until after the valves have been closed.

The device according to the invention comprises a safety member consisting of a tongue 23 preventing actuation of the lever 19 when the connector 7 is not positioned on the lid. This safety member consists of an elastic tongue 23 one end of which is integral with the rotating part or hub 24 of the lever and the other end of which tends to pivot outward under the effect of the elasticity of the material. This tongue 23 is guided during the pivoting of the lever 19 in a groove 25 made in a cheek integral with the connector. This groove 25 has an opening 26 facing downward, allowing the free end of the tongue to protrude and to bear against a wall delimiting the groove 25 when the lever is in the vertical valves-closed position as depicted in FIG. 5. For each tongue 23, a vertical finger 27, integral with the lid, presses against the free end of the tongue when the connector is introduced into the recess 4 in the lid, this pressing allowing the tongue to be retracted in the groove 25, which allows the lever to be pivoted in the direction for opening the valves and for attaching the connector to the lid.

As is evident from the foregoing, the invention provides a great improvement to the state of the art by supplying a filter external to a tank, of simple structure and allowing the valves that convey water from and return water to the tank to be closed and the connector detached from the lid of the filter in a single action. To refit the connector on the filter, the various operations are performed in a single action in the reverse order.

As goes without saying, the invention is not restricted to the sole embodiment of this filter described hereinabove by way of example; on the contrary, it encompasses all alternative forms thereof. Thus, in particular, the lever could be a lever pivoting not about a horizontal axis but about a vertical axis and driving, for example, a disk that serves to shut off the water supply and return pipes, this disk having notches allowing it to be immobilized in the pipes-closed position, to avoid any risk of accidental opening of these pipes once the filter had been disconnected.

What is claimed is:

1. A filter external to a tank, comprising:
   a vessel;
   a lid for closing the vessel;
   a removable connector including means of fixing the connector to the lid;
   a pipe for conveying water from the tank;
   a pipe for returning water to the tank; and
   couplings for connecting the two pipes to the connector, each coupling being equipped with a valve which selectively allows or prevents the passage of water;
   wherein the connector includes a single means for allowing simultaneous actuation of the valves and actuation of the means of fixing the connector so the lid.

2. The filter as claimed in claim 1, wherein the single means in a first movement closes the valves then releases the means of fixing the connector to the lid and in a second movement fixes the connector to the lid then opens the valves.

3. The filter as claimed in claim 2, wherein the single means includes a safety member which prevents the single means from being actuated when the connector is not positioned on the lid of the vessel.

4. The filter as claimed in claim 3, wherein the safety member comprises to an elastic tongue one end of which is intergal with a turning part of the lever and the other end of which is elastically pivotable outward, the tongue being guided while the lever pivots in a groove made in a cheek intergal with the connector, the grove being open and allowing the pivotable end of the tongue to emerge and bear against a wall delimiting the groove, when the lever is in a valve-closed position, the wall being situated forward in a direction of rotation toward an opening of the valves, a finger intergal with the lid being provided which, when the connector is positioned on the lid, passes on the pivotable end of the tongue to retract the tongue and allow the lever to be pivoted in a direction of opening of the valves.

5. The filter as claimed in claim 4, wherein the valves are in the closed position when the lever is in the vertical position, the free piovtable end of each safety tongue then being in a bottom of the hub, and the finger being vertical and facing upward.

6. The filters claimed in claim 1, wherein the single means includes a safety member which prevents the single means from being actuated when the connector is not positioned on the lid of the vessel.

7. The filter as claimed in claim 6, wherein the safety member comprises an elastic tongue one end of which is integral with a turning part of the lever and the other end of which is elastically pivotable outward, the tongue being guided while the lever pivots in a groove made in a cheek integral with the connector, the groove being open and allowing the pivotable end of the tongue to emerge and bear against a wall delimiting the groove, when the lever is in a valves-closed position, the wall being situated forward in a direction of rotation toward an opening of the valves, a finger integral with the lid being provided which, when the connector is positioned on the lid, presses no the pivotable end of the tongue to retract the tongue and allow the lever to be pivoted in a direction of opening of the valves.

8. The filter as claimed in claim 7, wherein the valves are in the closed position when the lever is in vertical position, the free pivotable end of each safety tongue being in a bottom position of the hub, and the finger being vertical and facing upward.

9. The filter in claim 6, wherein the single means the comprising a pivoting lever.

10. The filter as claimed in claim 9, wherein the lever can pivot about an axis parallel to a plane of the lid is arranged between the coupling and drives spherical plugs of the valves which also pivots about the axis, the connector comprising on an underside two portions of connecting piping engaged with two portions of lid piping allowing liquid to pass between the vessel and the pipes, the lever comprising an actuating part protruding from an upper face of the connector and a catching part including a ramp to catch behind a finger intergal with the lid.

11. The filter as claimed in claim 9, wherein the upper wall of the lid of the vessel has a a recess into which the connector is fitable.

12. The filter as claimed in claim 1, wherein the single means comprises a pivoting lever.

13. The filter as claimed in claim 12, wherein the lever can pivot about an axis parallel to a plane of the lid, the level is arranged between the couplings and drives spherical plugs of the valves which also pivot about the axis, the connector comprising on an underside two portions of connector piping engaged with two portions of lid piping allowing liquid to pass between the vessel and the pipes, the lever comprising an actuating part protruding from an upper face of the connector and a catching part including a ramp to catch behind a finger integral with the lid, 14. The filter as claimed in claim 12, wherein the upper wall of the lid of the vessel has a recess into which the connector is fitable.

* * * * *

UNITED STATES PATENT AND TRADEMARK OFFICE
CERTIFICATE OF CORRECTION

PATENT NO. : 6,712,961 B2 Page 1 of 1
DATED : March 30, 2004
INVENTOR(S) : Jacques Jean Chauquet It is certified that error appears in the above-identified patent and that said Letters Patent is hereby corrected as shown below:

Column 4,
Line 49, "so" should be -- to --.
Line 61, delete "to".
Line 65, "grove" should be -- groove --.

Column 5,
Line 1, "valve-closed" should be -- valves-closed --.
Line 4, "passes" should be -- presses --.
Line 10, after "bottom", insert -- position --.
Line 12, after "filters", insert -- as --.
Line 27, "no" should be -- on --.
Line 31, before "vertical", insert -- a --.
Line 32, after "tongue", insert -- then --.

Column 6,
Line 1, after "filter" insert -- , as claimed -- and delete "the" (third occurrence).
Line 2, "comprising" should be -- comprises --.
Line 4, after "lid", insert -- , the lever --.
Line 6, "pivots" should be -- pivot --.
Line 14, delete "a", (second occurrence).
Line 19, "level" should be -- lever --.
Line 27, the comma should be a period.

Signed and Sealed this

Twenty-third Day of May, 2006

JON W. DUDAS
*Director of the United States Patent and Trademark Office*